United States Patent [19]

Bahr

[11] 4,181,616

[45] Jan. 1, 1980

[54] DEVICE FOR DEWATERING SLUDGE OR THE LIKE

[76] Inventor: Albert Bahr, Am Stockfeld 69, D-6680 Neunkirchen-Kohlhof, Fed. Rep. of Germany

[21] Appl. No.: 820,015

[22] Filed: Jul. 28, 1977

Related U.S. Application Data

[63] Continuation-in-part of Ser. No. 632,689, Nov. 17, 1975, abandoned.

[30] Foreign Application Priority Data

Aug. 5, 1976 [DE] Fed. Rep. of Germany ....... 2635196

[51] Int. Cl.² ............................................. B01D 33/00
[52] U.S. Cl. .................................... 210/297; 100/118; 162/348; 210/386; 210/401
[58] Field of Search .............. 162/348, 351, 352, 353, 162/374; 210/65, 350, 73, 386, 170, 400, 294, 401, 297, 402, 330, 513, 519, 523, 526, 77; 100/110, 111, 116, 118, 120, 121, 126, 131, 151, 152, 153, 154; 209/255, 259, 272, 307, 308; 37/69, 70; 43/6.5; 198/153

[56] References Cited

U.S. PATENT DOCUMENTS

| 21,723 | 2/1841 | Thompson | 210/197 |
|---|---|---|---|
| 525,525 | 9/1894 | Anderson | 100/118 |
| 2,010,150 | 8/1935 | Hemphill | 162/351 |
| 2,858,746 | 11/1958 | Goodwillie | 162/353 X |
| 2,934,153 | 4/1960 | Hornbostel | 162/351 |
| 2,957,522 | 10/1960 | Gatke | 162/374 |
| 3,096,235 | 7/1963 | Taylor | 162/374 |
| 3,578,561 | 5/1971 | McCarrick et al. | 162/352 |
| 3,595,400 | 7/1971 | Peterson | 210/327 |
| 3,595,747 | 7/1971 | Walser | 162/374 |
| 3,605,607 | 9/1971 | Gujer | 100/118 |
| 3,637,460 | 1/1972 | Newsom et al. | 162/352 |
| 3,699,881 | 10/1972 | Levin et al. | 100/118 |
| 3,800,952 | 4/1974 | Bastgen | 210/324 |
| 3,821,928 | 7/1974 | Sugita | 100/118 |
| 3,876,500 | 4/1975 | Csordas et al. | 162/351 |
| 3,896,030 | 7/1975 | Bahr | 210/384 |
| 3,897,341 | 7/1975 | Ozawa | 210/386 |
| 3,928,125 | 12/1975 | Poeschl | 162/352 |

FOREIGN PATENT DOCUMENTS

| 1786320 | 1/1972 | Fed. Rep. of Germany . |
|---|---|---|
| 2246055 | 4/1973 | Fed. Rep. of Germany . |
| 2330029 | 3/1975 | Fed. Rep. of Germany . |
| 2343324 | 3/1975 | Fed. Rep. of Germany . |
| 2441241 | 6/1975 | Fed. Rep. of Germany . |
| 2506173 | 8/1976 | Fed. Rep. of Germany . |
| 2154700 | 11/1973 | France . |
| 2242133 | 8/1974 | France . |
| 1404094 | 8/1975 | United Kingdom . |

*Primary Examiner*—Theodore A. Granger

[57] ABSTRACT

A device for dewatering sludge or the like, particularly sludge from water purification plants, having a preliminary pressureless pocket dewatering stage A, one or more horizontal dewatering zones B formed by horizontally extending filter belts located below the preliminary stage A, those zones being located serially one below another, a medium pressure drum filter stage C, and thereafter a high-pressure dewatering unit D.

27 Claims, 18 Drawing Figures

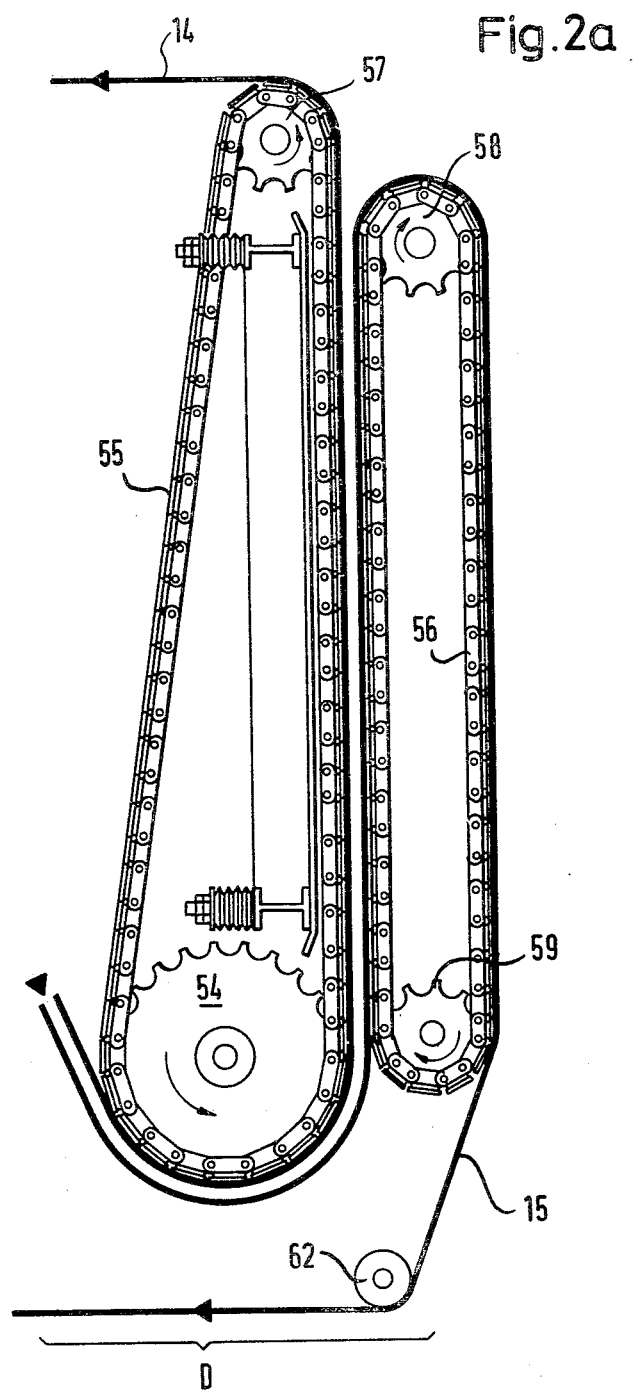

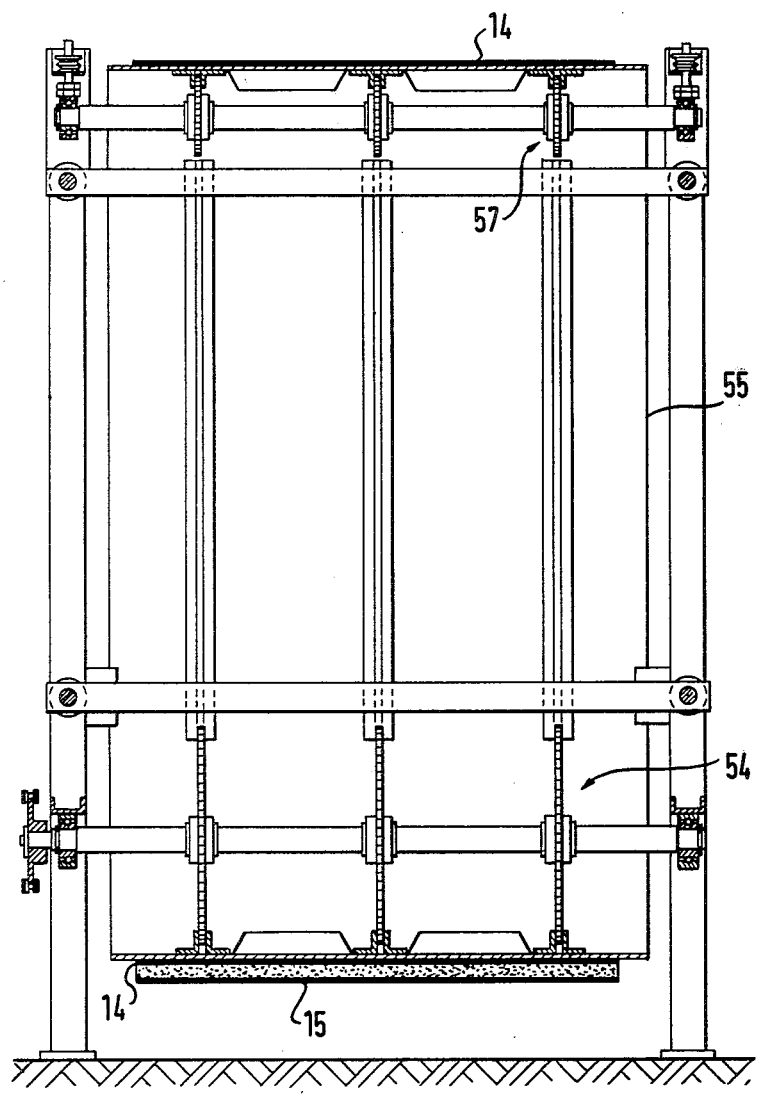

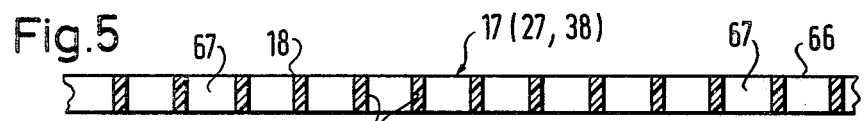
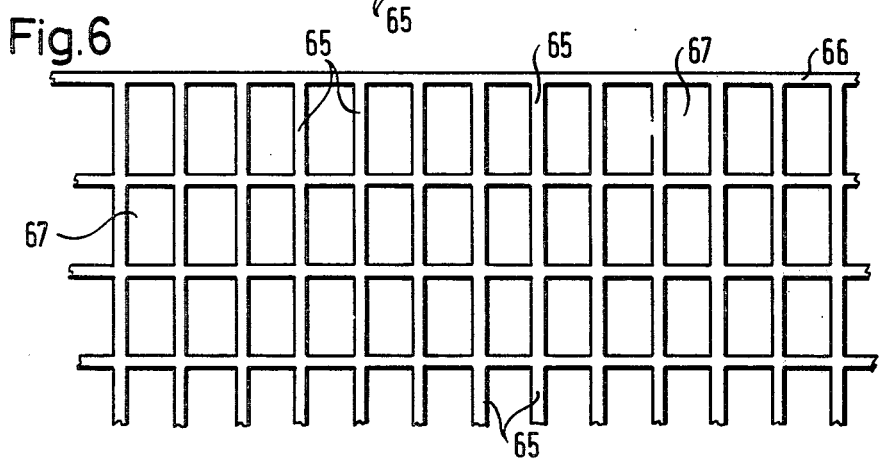
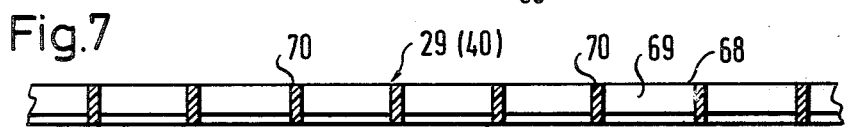
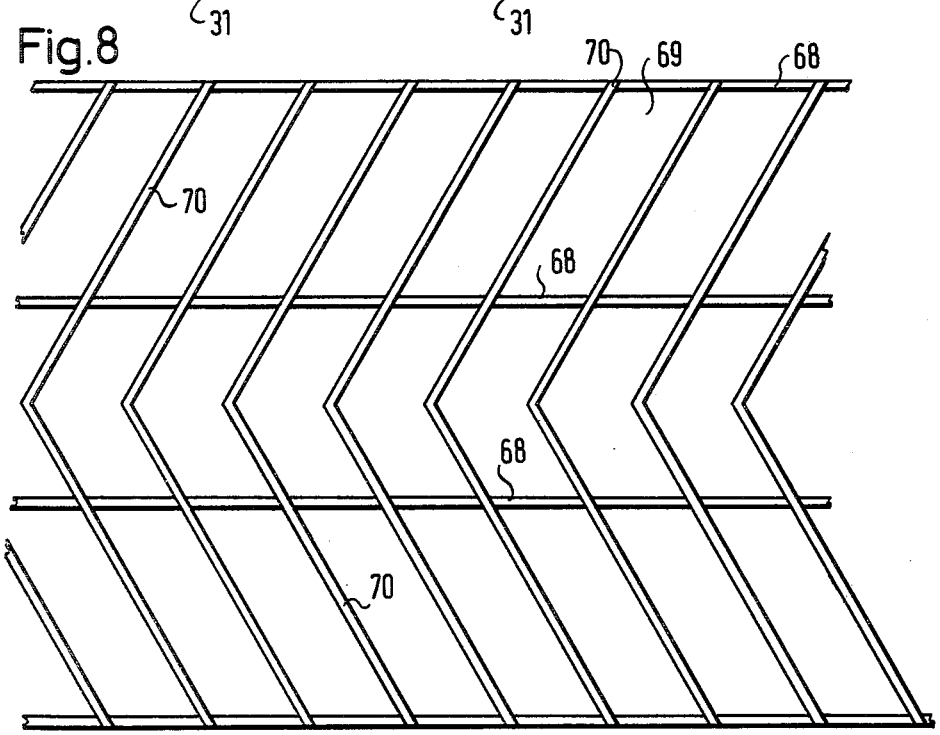

DEVICE FOR DEWATERING SLUDGE OR THE LIKE

CROSS-REFERENCE TO RELATED APPLICATION

This application is a continuation-in-part of my prior application Ser. No. 632,689, filed Nov. 17, 1975, now abandoned.

BACKGROUND

My prior application Ser. No. 632,689, filed Nov. 17, 1975, now abandoned the entire disclosure of which is hereby incorporated herein by reference, relates to a device for dewatering sludge or similar substances, more particularly sludge yielded in water purification plants or the like by filtration, wherein one or more preliminary dewatering units are disposed in front of a drum filter press and/or one or more high-pressure dewatering units are disposed thereafter.

BRIEF SUMMARY OF THE INVENTION

The present invention relates to a further development and a specifically preferred embodiment of the prior application, and its aim is to provide a device for dewatering sludge or similar substances, which is very compact but has high dewatering efficiency. In solving this problem, the invention is based on the idea of subjecting the sludge or similar substances to very uniform dewatering by gravity while the substances are in the comparatively liquid phase, more particularly after a first preliminary dewatering in the rotating filter pockets, which form a preliminary dewatering facility according to the prior application. In this manner, according to the present invention, the drum press forming the medium-pressure stage and, if required, the platen band press according to the prior application, which forms the high-pressure dewatering stage, can be constructed much more simply and therefore more economically.

Starting from a device for dewatering sludge or similar substances, more particularly sludge yielded in water purification plants or the like by filtration, wherein, according to the prior application, one or more preliminary dewatering units are disposed in front of a medium-pressure stage formed by a drum filter press and/or one or more high-pressure dewatering stages are disposed downstream and, furthermore, a preliminary dewatering unit is provided with rotating filter pockets, the problem is solved substantially in that one or more horizontal dewatering zones are provided between the preliminary dewatering unit and the medium-pressure stage, the zones being formed by the filter belts, which extend horizontally at this place, and the zones being disposed one above another and below the filter pockets.

In this and similar manner, the main advantages of the device according to the invention are that (a) the available dewatering zone is lengthened, so that a comparatively high content of dry substance is obtained even during preliminary dewatering and (b) the substances for dewatering are conveyed only downwards until they reach the required degree of solidity.

According to another advantageous feature, the filter belt moving at the bottom is slideably disposed, without interposition of rollers or the like, in the dewatering zone on a flat surface permeable to fluid.

In a preferred embodiment of the invention, the flat surface is constructed as a screen member which has skimming edges extending transversely to the conveying direction, for the liquid leaving the rear side of the filter belt. In a specially preferred embodiment of the device according to the invention, each top filter belt cooperates with the corresponding bottom filter belt to form a wedge-shaped compartment which tapers in the conveying direction in the dewatering zones. In this connection in accordance with a particularly advantageous feature, a screen member is disposed on the rear side of each top filter belt, bears on its surface and has skimming edges which extend at an angle to the conveying direction and remove the fluid leaving the rear side of the filter belt.

Advantageously the screen members are made of plastic, thus advantageously achieving low friction with the filter belts.

In order to obtain higher stripping pressures, in accordance with a variant, pressure rollers are disposed on the rear side of each top filter belt, the rollers extending at an angle to the conveying direction and laterally deflecting the liquid emerging at the rear side.

According to another advantageous feature, a seal is provided in the dewatering zone at the side edges between the top and bottom filter belt, the seal being resiliently deformable in accordance with the wedge shape.

According to a particularly preferred feature, the top screen members are resiliently suspended or are spring biased to form pressure grids and are made adjustable in accordance with the wedge-shape.

The aforementioned embodiments follow the development of the prior application, constructing a device of the aforementioned kind which can be described as a continuously operating chamber press. The completely flat dewatering zones disposed between the pocket dewatering unit and the medium-pressure stage have the advantages, in conjunction with the skimming edges, that (a) sludge on the filter belts is not unnecessarily moved by being guided over rollers or the like (this is particularly important to ensure a high degree of dewatering) and (b) the water leaving the filter belts at the rear is removed rapidly and efficiently. Since the dewatering zones now extend in absolutely straight lines, comparatively uncomplicated seals of the previously-mentioned kind can be provided at the side, thus substantially approaching the aim of a continuously operating chamber filter press. In addition, as one skilled in the art can easily see from the description and drawings of the embodiments described hereinafter, the aforementioned dewatering zones can be repeated as often as required at comparatively low constructional cost, depending on the desired content of dry substance.

Additional embodiments illustrate simplification of the medium-pressure stage or the adjacent high-pressure stage which can be achieved by inserting the previously-described dewatering zones.

BRIEF DESCRIPTION OF THE DRAWINGS

The invention will now be described in greater detail with reference to embodiments shown by way of example in the drawings, wherein:

FIG. 2a shows details of the high-pressure stage D;

FIG. 3 is a sectional view of FIG. 2 along line III—III;

FIG. 5 is a sectional view of a first embodiment of one of the bottom screen bodies in the device according to FIGS. 1-4;

FIG. 6 is a plan view of the screen member in FIG. 5;

FIG. 7 is a sectional view of a first embodiment without the top screen member in the device according to FIGS. 1-4;

FIG. 8 is a plan view of the screen member in FIG. 7;

Figure 1:
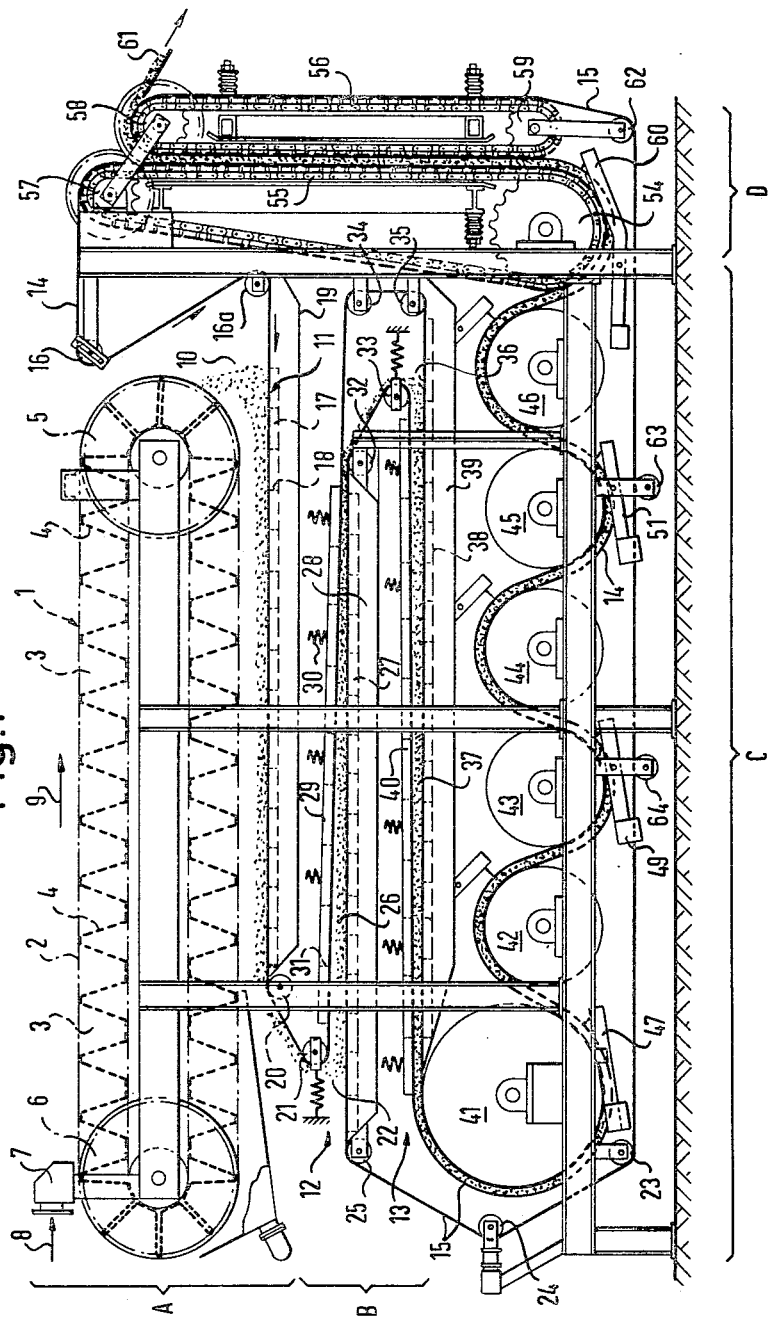
FIG. 1 is a partly cut-away side view of a first embodiment of the invention.

The embodiment of the invention shown in the drawings, in contrast to the prior application, has an extensible stage which can be regarded as adapted for four-stage operation. In the embodiment of the invention described here, the various dewatering phases are as follows: a pressureless pocket dewatering stage A, an intermediate stage B in which the pressure is raised from zero to a low value, a medium-pressure stage C and a high-pressure stage D (see FIG. 1).

In all the embodiments, the pressureless preliminary dewatering stage A comprises a rotating belt pocket filter which, depending on the effective filter area, is adapted for higher filter capacity or a higher degree of separation in the final sludge. The belt pocket filter, which bears the general reference numeral 1, is similar in construction to the belt filter pocket according to the prior application, but is longer, due to the construction of the medium-pressure stage C (described in greater detail hereinafter) and forms a compact unit which can be placed on the rest of the device.

Filter 1 comprises an endless conveyor 2 disposed in a housing (not shown) and having screen pockets 3 having walls made of a suitable screen material 4 or perforated sheet-metal, conveyor 2 being guided at both ends around bucket wheels 5 and 6, one of which is driven.

Flocculated sludge is introduced through an inlet 7 into the individual pockets 3 of the band pocket filter 1, as indicated by arrow 8 in FIG. 1, and is dewatered during its travel through the zone from the bucket wheel 6 to the bucket wheel 5 in FIG. 1, in the direction of arrow 9. The water leaving through the filter pockets is connected in a drip pan and removed at the side.

The pressureless pre-dewatered sludge from filter pockets 3 travels at 10 to the first preliminary dewatering zone of the interposed preliminary dewatering stage B.

In the embodiments in FIGS. 1, 2, 14 and 15 stage B, which can also be regarded as an extended feed zone on the medium-pressure stage C, comprises three dewatering zones 11, 12 and 13.

After preliminary dewatering in filter 1, therefore, sludge travels at 10 to the first filter belt 14, which extends at the top from the high-pressure stage D, is deflected over rollers 16, 16a and then extends horizontally into the preliminary dewatering zone 11. The second filter belt is labeled 15.

In the preliminary dewatering zone, filter belt 14 is completely flat and, without interposition of guide rollers or the like, slides on an additional screen member 16a described in detail hereinafter, so that the conveyed sludge is subjected to further pressureless preliminary dewatering in a gentle manner, without vibrations, whereupon the water emerging by gravity from the rear side of the first filter belt 14 is stripped therefrom by the walls or ribs 18 of screen member 17, which extend at right angles to the conveying direction, ie. the water cannot be pumped back into the sludge. The stripped water is collected in a trough 19 under member 17 and removed at the side.

At the end of the dewatering zone 11 belt 14 is deflected over a roller 20 and a tension roller 21, so that the sludge, after being deflected, is conveyed to the second preliminary dewatering zone 12 or 22 on to the second filter belt 15, which is conveyed backwards from beneath via rollers 23, 24, and 25.

The second dewatering zone 12 is constructed as a wedge-shaped first feed compartment 26, bounded by the filter belts 14 and 15. In the wedge-shaped feed compartment, a second filter belt, like the first, slides in a completely horizontal manner on a screen member 27; as before, the emerging water is stripped, collected in a trough 28, and removed at the side. The top of the first filter belt 14, which bounds the top of the wedge-shaped feed compartment 26, bears on a screen member 29 which is pressed by springs 30 against belt 14 and is adjustable in height and has walls or ribs 31 which are V-shaped or extend at an angle to the conveying direction and laterally remove the water leaving from the top side of belt 14. Screen member 29 exerts a pressure, facilitating dewatering, on the sludge in the wedge-shaped compartment 26.

At the end of the second dewatering zone 12, the second filter belt is deflected towards around a roller 32 and a tension roller 33, whereas the first filter belt 14 is guided downwards on the outside right, over rollers 34 and 35, so that at 36 the sludge makes another turn and is delivered to the first conveyor-belt 14, which in this case enters the third dewatering zone.

The third dewatering zone 13 is likewise constructed as a wedge-shaped feed compartment 37 for the medium-pressure stage C and is constructed in similar manner to the second dewatering zone 12. In the present case, belt 14 slides on a screen member 38, which is constructed in similar manner to screen members 17 and 27, and the stripped water, as before, is collected in a trough 39 and removed at the side. At the top, the wedge-shaped feed compartment 37 is bounded by another spring-biased, adjustable screen member 40, which in the present case bears on the top side of belt 15 and has the same action and construction as screen member 29.

To obtain higher stripping pressures the top screen members may be replaced by pressure rollers (not shown) which likewise preferably extend at an angle to the conveying direction.

Belts 14 and 15 are made of fine-mesh wire, gauze, the mesh width being chosen in accordance with the applied pressure. Preferably, however, the filter belts are made of plastic fabric, since this ensures the most advantageous adaption of the friction with regard to the screen members, which are preferably made of plastic.

After leaving the wedge-shaped feed compartment 37 at the end of the dewatering zone 13, belts 14 and 15, holding the sludge cake between them, travel around a first drum 41, which forms the beginning of the medium-pressure stage C. Beyond drum 41 belts 14 and 15, alternately above and below, extend around a number of adjacent and parallel drums 42, 43, 44, 45 and 46, which together form the medium pressure stage in the illustrated embodiment. The advantage here, as compared with the prior application, is a still more compact construction and a considerable reduction in manufacturing cost, since a single large drum, as in the prior application, has to be specially manufactured in each case. Since the medium-pressure stage is made up of a number of drums, around which the sludge is conveyed in an undulating path between the filter belts, liquid removal is carried out alternately from each side of the sludge layer. This results is considerably improved removal of filtrate.

Figure 2:
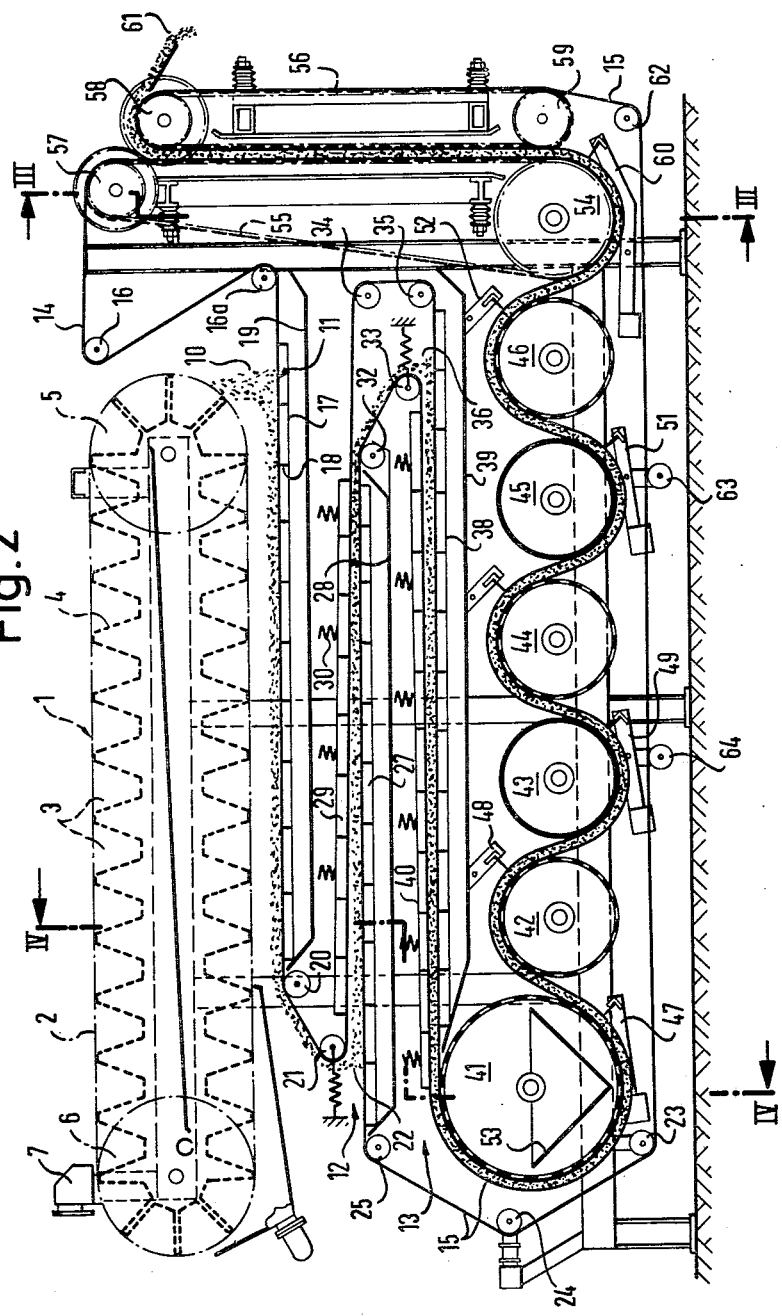
FIG. 2 is a sectional view of the device according to FIG. 1.

As shown more particularly in FIG. 2, the drums at which the filtrate arrives at the top, i.e. drums 41, 42, 44 and 46, are perforated whereas the drums at which the filtrate arrives at the bottom, i.e. drums 43 and 45, are smooth and unperforated. This again considerably improves the removal of filtrate. A water stripper of wiper 47, 48, 49, 50, 51, 52 respectively is disposed on the outside of each respective drum and wipes off the filtrate emerging from the rear side of belt 14 or 15 and thus further intensifies the removal of water.

To obtain higher pressures the wipers shown can be replaced by pressure-rollers (not shown) for removing the emerging filtrate.

In the first drum 41, which is given a somewhat larger diameter than the remaining drums of the medium-pressure stage, there is also a drip pan 53, which collects filtrate falling through the holes into the interior of drum 41 and removes it at the side. The other drums in the medium-pressure stage do not need any drip pans, since the filtrate can fall freely through gravity.

After leaving the last drum 46 of the medium-pressure stage, the two filter belts 14 and 15, holding the sludge cake between them, travel upwards to a high-pressure stage. The high-pressure stage D has a dewatering zone of approximately the same length as in the parent patent but is not divided; this greatly simplifies the construction and reduces the manufacturing cost.

As in the parent patent, the high-pressure stage D is a platen belt press, has substantially the same mechanical construction and, in order to obtain a maximum content of dry substance, must exert a very high and steady pressure on the sludge which already, after leaving the medium-pressure dewatering unit, has a comparatively high solids content and is in a fairly solid general condition. As shown more particularly in FIGS. 1 and 2, filter belts 14, 15 travel into the nip between the belts, via a comparatively large bottom deflecting wheel 34, which is also the bottom reversal point of one out of two platen belts described in detail hereinafter. Wheel 54, compared with the platen press in the prior application, is given a relatively large diameter, substantially equal to the diameter of the row of drums 42-46. This prevents the filter cake, which is relatively brittle at this time, from breaking and falling out between belts 14 and 15 before they reach the nip.

The platen belt press or high-pressure stage D proper has two substantially similar platen belts 55 and 56 which, by means of a drive, (not shown) travel round corresponding chain drums 57, 58, 59 and the previously mentioned 54. Apart from details, which are described with reference to FIGS. 11–13, platen belts 55 and 56 are constructed as in the high-pressure stage in the prior application. An additional water stripper 60 is provided at wheel 54.

In the simplified embodiment according to the present invention, only one platen belt has to be biased in the direction of the other platen belt, but additional interacting biasing devices can be provided as shown in FIGS. 1 and 2.

The biasing can be produced by stacks of springs exerting a desired pressure of, if required, by hydraulic cylinders (not shown).

Filter bands 14 and 15 are so guided according to the invention that the discharge for the dewatered sludge is at an elevated position, as shown at 61, i.e. the sludge can be discharged directly into troughs or suitable vehicles.

After the discharge 61, belt 15 travels on the outside downwards over the platen belt to the right in the drawing, is deflected round a roller 62 and is conveyed on rollers 63, 64 below the medium-pressure stage back to the aforementioned roller 23 and thence to the preliminary dewatering zone 12. Belt 14 comes from the top from the nip between platen belts 55,56 back to the aforementioned rollers 16 and 17 and thence to the first preliminary dewatering zone 11.

FIG. 3 in sectional view, is a diagram of some mechanical details of the high-pressure stage D.

FIGS. 5 and 6 show a first embodiment of the bottom screen members 17, 27, and 38, on which the filter belts 14, 15 slide in the interposed dewatering zones 11, 12 and 13. As shown in the sectional view in FIG. 5, walls 65 of the preferably plastic screen member extend at right angles to the conveying direction and form the skimming edges 18, which strip the fluid emerging from the back of each filter belt and convey it downwards through the rectangular apertures 67 left between the transverse walls 65 and the longitudinal walls 66 of a screen member.

FIGS. 7, 8, show an embodiment of the top screen members 29 and 40 which are biased in the direction of the two wedge-shaped feed compartments. Since the fluid emerging at the top side of filter belts 14, 15 must be removed very quickly at the side without flowing back to the dewatered sludge, in the present embodiment of the screen members the longitudinal walls 68, which cooperate with the transverse walls 70 to bound the flow apertures 69, are constructed so that the skimming edges 31 can, without hindrance, convey the emerging filtrate to the side. To this end, in the illustrated embodiment, the transverse walls 70 are made V-shaped and the longitudinal walls 68 are somewhat lower than walls 70, so that the skimming edge 31 has a continuous shape, without being interrupted by longitudinal walls.

Figure 9:
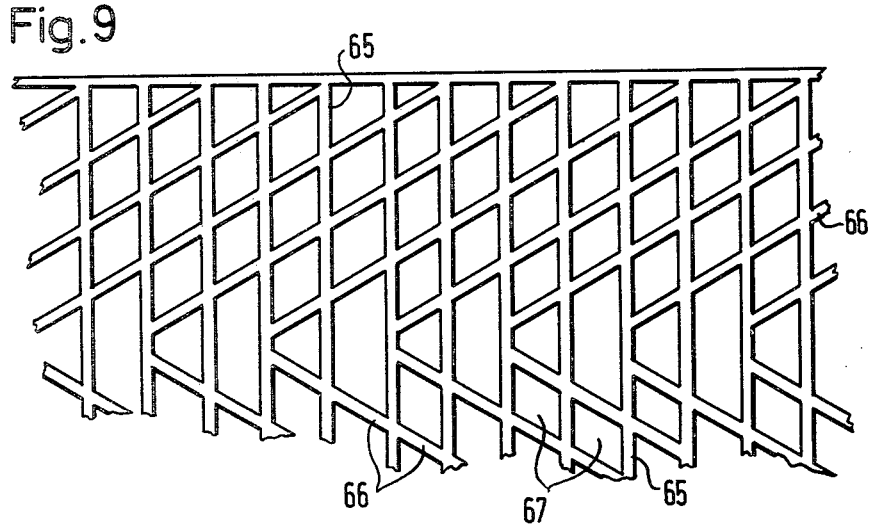
FIG. 9 is a plan view of a modified embodiment of a screen member.

FIG. 9 illustrates a modified form of one of the lower screen members, which advantageously ensures smoother operation.

Figure 10:
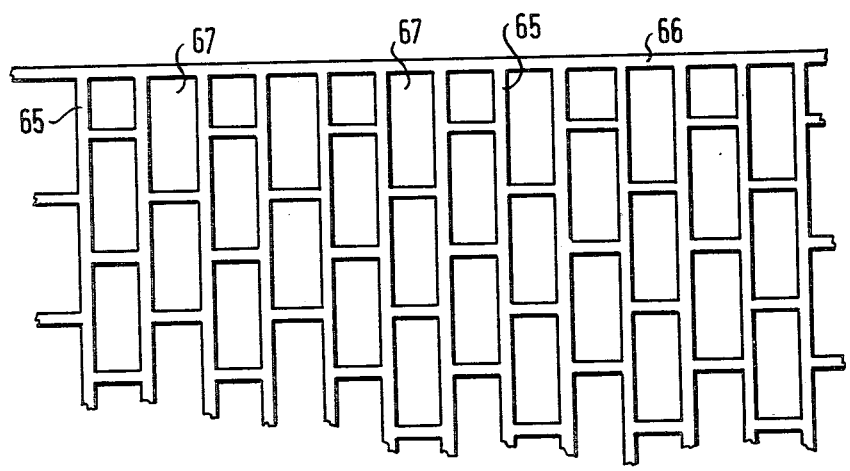
FIG. 10 is a plan view of another embodiment of a screen member.

FIG. 10 shows another means of disposing the flow apertures in a screen member of the kind in question.

Figure 11:
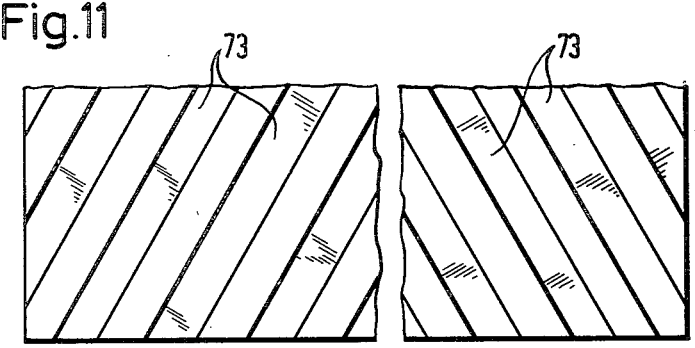
FIG. 11 is a plan view of the surface of the platen belt of the high-pressure stage.
Figure 12:
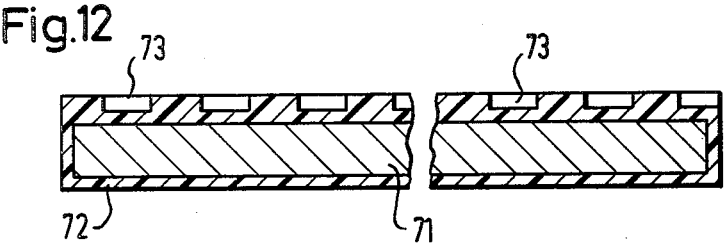
FIG. 12 is a sectional view of FIG. 11.
Figure 13:
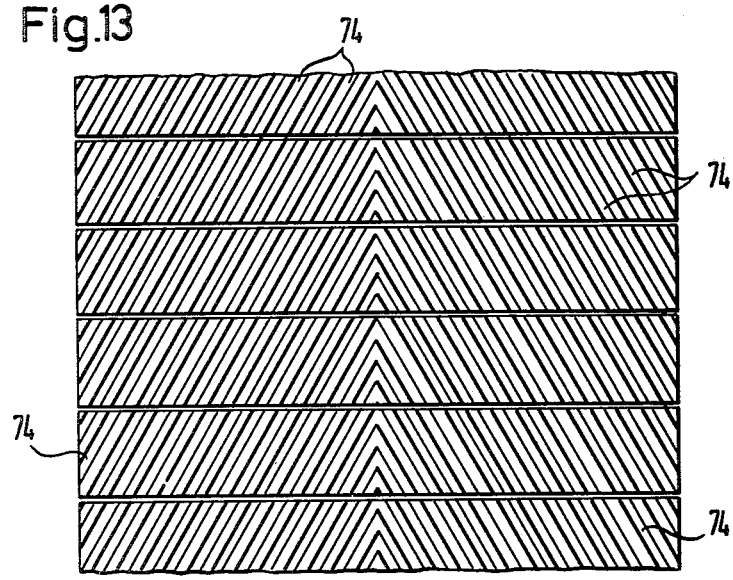
FIG. 13 is a plan view of the surface of the platen band of the high-pressure stage, showing a pattern produced by combining a number of plates.

FIGS. 11-13 show details of a specially preferred embodiment of the platen belts 55, 56 of the high-pressure stage D. The same embodiment is used to convey the filtrate along a particularly advantageous path when it leaves the rear side of filter belts 14 and 15.

To this end, each plate of each platen belt is given the required rigidity by a steel core 71 surrounded by a plastic layer 72. On the side facing the filter belts, the platen-belt plate has grooves 73 extending diagonally or forming a V, as in the illustrated embodiment. Grooves 73 are about 8 mm deep and are integral with the plastic coating 72. As FIG. 13 shows, when a number of plates are placed together, grooves 73 form continuous flow paths 74 which rapidly remove the emerging filtrate, so that when the filter belts are unloaded at the discharge 61 the filtrate cannot be pumped back into the dried sludge.

Figure 4:
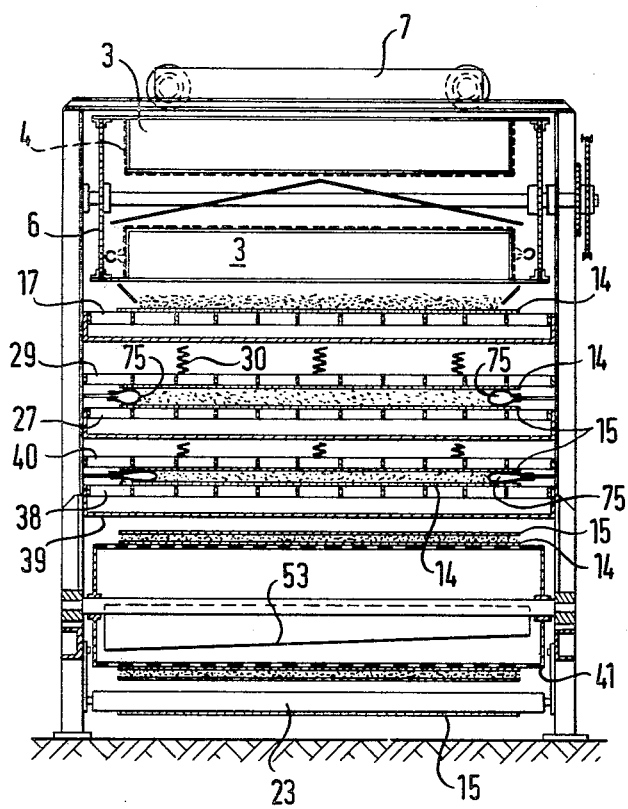
FIG. 4 is a sectional view of FIG. 1 along line IV—IV.
Figure 14:
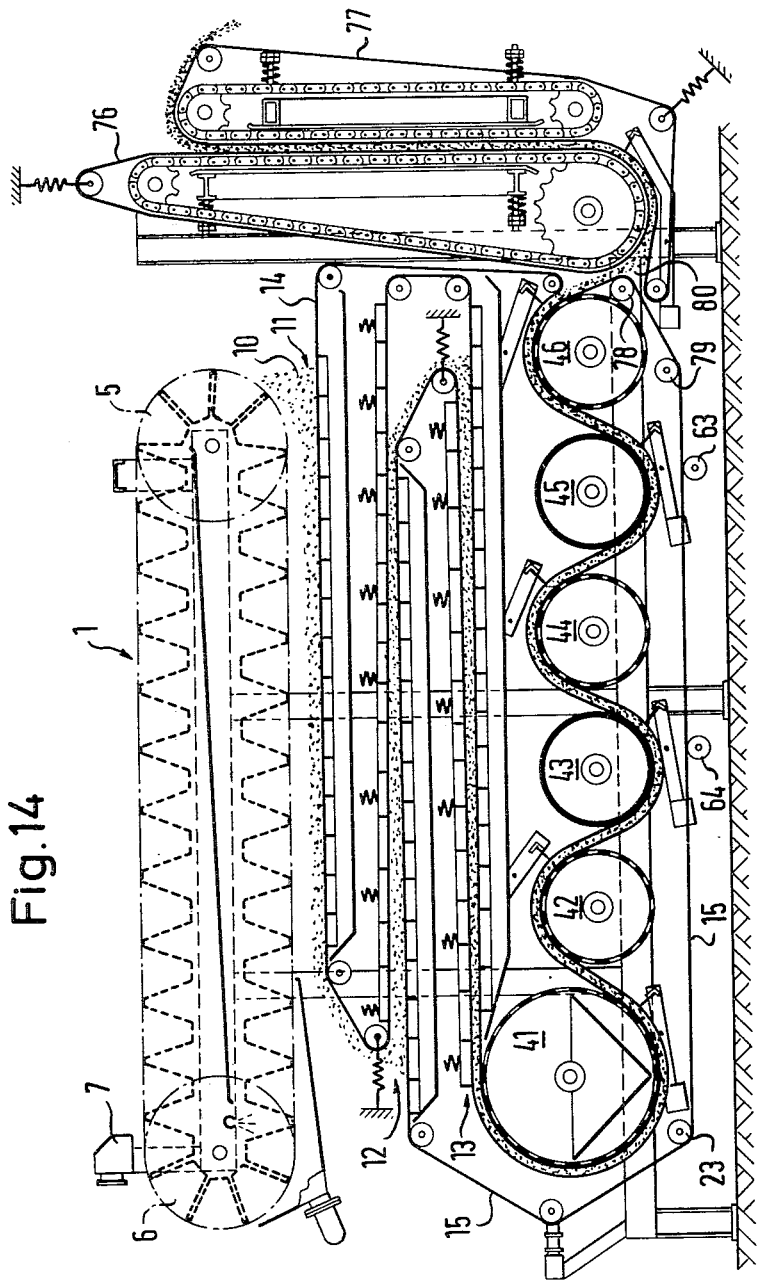
FIG. 14 is a sectional side view of a modified embodiment of the device according to the invention.
Figure 15:
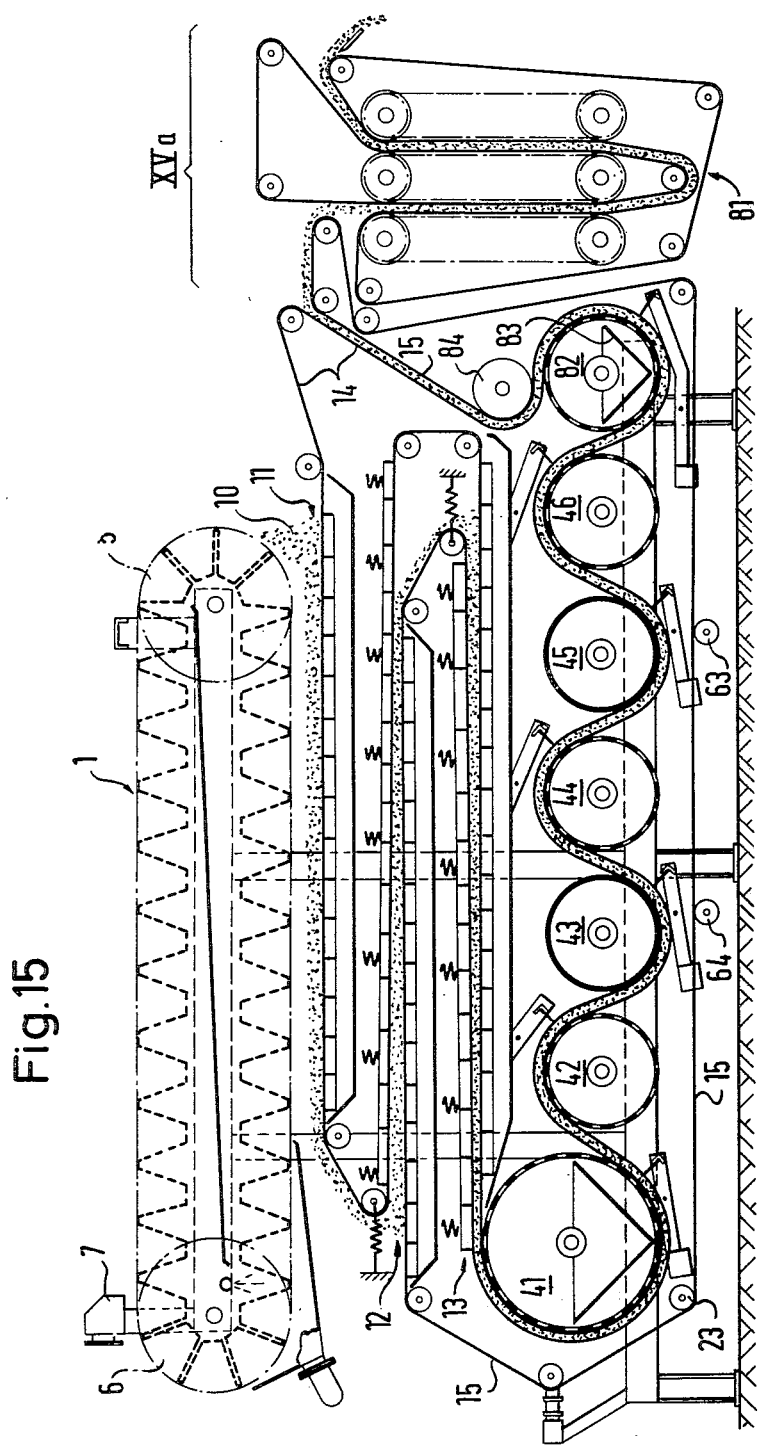
FIG. 15 shows another modified embodiment of the device according to the invention.
Figure 16:
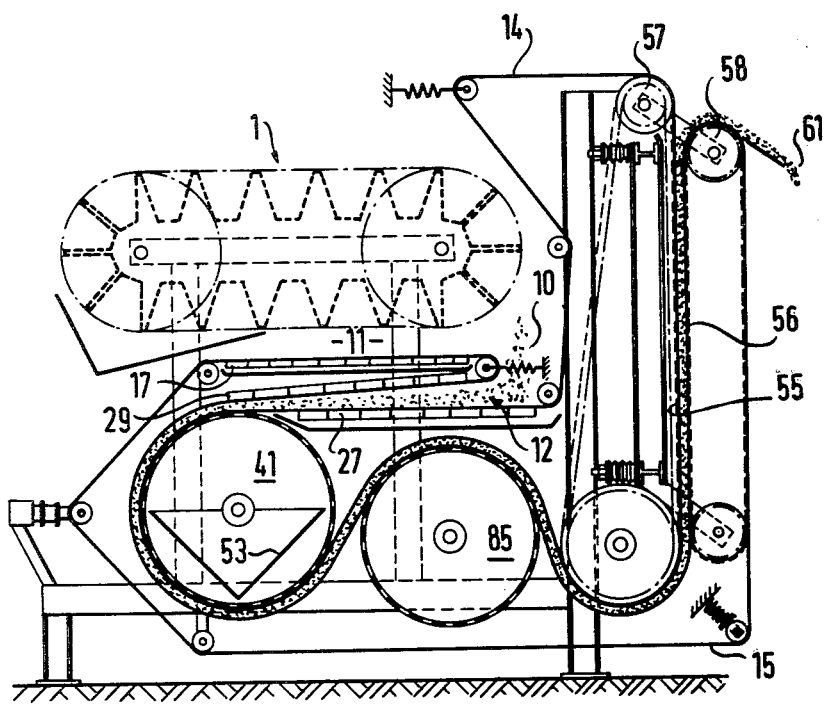
FIG. 16 shows another embodiment of the device according to the invention, which is particularly simple and compact.

Before describing the embodiments in FIGS. 14-16, we shall briefly give a more detailed description of an important detail illustrated in FIG. 4.

As FIG. 4 shows, the interposed dewatering zones 12 and 13 are constructed so that each lateral gap between filter belts 14 and 15 is closed by seals 75 so that the sludge, which is still comparatively liquid at this stage, can be exposed to pressure by screen member 29 or 40 without escaping laterally between belts 14 and 15. The seals are preferably resilient elongated hollow members matching the wedge shape on both sides of a wedge-shaped feed zone. The result, if the friction between the filter belts and the seal is adjusted by choosing the materials thereof, is a particularly simple construction ensuring that the seals 75 are laterally suspended and remain stationary and do not share any of the motion of the filter belts.

Apart from the guidance of filter belts 14, 15 and the fact that the high-pressure stage D comprises filter belts 76, 77 separate from the belts 14 and 15, the embodiment shown in FIG. 14 is identical with the embodiment in FIGS. 1 and 2, i.e. there is no need to repeat the description of mechanical details.

In contrast to the embodiment in FIGS. 1 and 2, after filter belt 15 runs over the last perforated drum 46 of the medium-pressure stage C it is guided upwards over a reversal roller 78 and an additional reversal roller 79 to the previously-mentioned guide rollers 63, 64 and back to the second dewatering zone 12. The second filter belt 14, after travelling over the last perforated drum 46 of the medium-pressure stage C, is conveyed by suitable reversal rollers directly upwards to the first interposed dewatering zone 11.

With regard to the reversal roller 78, the dried sludge cake is transferred at 80 to the filter belt 77 of the high-pressure stage D and is conveyed upwards between belt 77 and belt 76 into the nip of the platen press. The advantage of this embodiment is that the mesh width of belts 76, 77 can be chosen in accordance with the much firmer general state of the sludge and in addition the speed of the high-pressure stage D can be controlled independently, in accordance with the reduced volume of sludge.

Figure 15A:
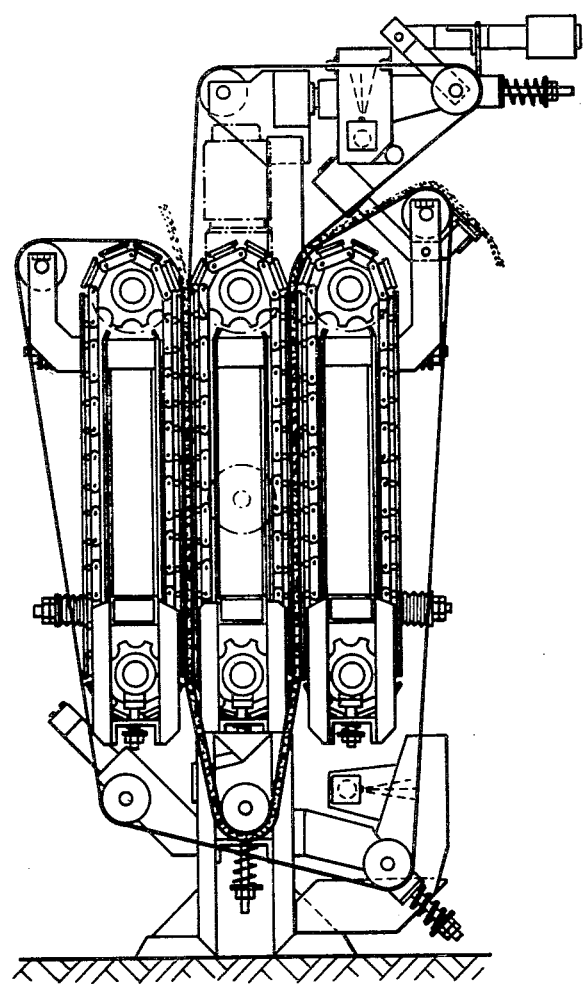
FIG. 15a is a sectional side view of the highpressure stage according to FIG. 15.

FIG. 15 shows another modified embodiment of the invention, in which the previously-described construction of the high-pressure stage is replaced by a separate high-pressure platen press, which is connected downstream as in the prior application. The structural details are shown in FIG. 15a and need not be described in detail here. However, in order to convey the sludge downwards into the high-pressure platen press according to the prior application, which here bears the general reference 81, the filter belts 14, 16 bearing the sludge cake between them are conveyed, after leaving the perforated drum 46 of the medium-pressure stage, around a perforated drum 82 provided with a drip pan 83 and upwards around a large-diameter reversal roller 84. Consequently, the filter cake between belts 14 and 15 is conveyed to the top region of platen press 81, where it is conveyed over corresponding reversing rollers and discharged from belt 15 into the nip, after which the belt is returned by suitable reversal rollers to the second dewatering zone 12.

FIG. 16 shows an embodiment of the device according to the invention which operates in similar manner to the embodiment in FIGS. 1 and 2 but is much simpler and shorter thatn the last-mentioned embodiment, but is adequate for many cases where the sludge is comparatively easy to dewater.

The main differences are that the three interposed dewatering zones are replaced by only two dewatering zones 11 and 12, beyond which the filter belts 14 and 15, with the sludge cake between them, are conveyed around the perforated drum 41. In the shortened version of the device according to the invention, the five alternately perforated and smooth drums in the first embodiment are replaced by a single perforated drum 85 having a diameter slightly greater than that of the alternating drums in the first embodiment. On leaving the drums, the filter belts are conveyed through the high-pressure stage D in the previously-described manner.

What is claimed is:

1. A device for dewatering sludge comprising:

means for supplying sludge to be dewatered;

A first gravity pressure dewatering stage having a plurality of endlessly rotating perforated filter pockets for receiving sludge from said means for supplying and for straining water therethrough;

a second dewatering stage located below and coupled to the output of said first dewatering stage, said second stage including a plurality of sequentially arranged horizontal dewatering zones and a pair of ,perforated horizontal filter belts each associated with a respective horizontal dewatering zone, the output of one horizontal zone feeding the input of another for further straining water from sludge exiting from said first stage, said horizontal dewatering zones being provided one above another with a first such horizontal dewatering zone receiving output sludge from said first stage, each of said horizontal filter belts sliding across a respective horizontal dewatering zone on a flat surface permeable to fluid and cooperating with the other filter belt to form a wedge shaped compartment in each horizontal zone which tapers in the direction of sludge movement through the associated horizontal dewatering zone, said wedge shaped compartment applying greater than gravity pressure to the sludge as it passes therethrough;

a third dewatering stage located below said first and second dewatering stages and coupled to receive the output sludge of said second dewatering stage, said third stage receiving said pair of horizontal filter belts from the last horizontal dewatering zone of said second dewatering stage and including at least two drums against which said pair of filter belts is pressed, the pressure applied to sludge by the pressing contact of said pair of filter belts with said drums being higher than pressure applied to sludge by said pair of filter belts defining said wedge shaped compartment; and, a fourth dewatering stage for receiving said pair of filter belts from said third stage and applying pressure to sludge greater than that applied by said third dewatering stage and for discharging dewatered sludge, said fourth stage comprising two endless rotating platen belts pressurized towards one another, said pair of filter belts passing through the nip defined by said platen belts.

2. The device of claim 1, wherein a respective pressure roller assembly is disposed on the rear side of each filter belt which forms the top of a said wedge-shaped compartment, said pressure roller assembly extending at an angle to the direction of sludge transport and laterally deflecting the liquid emerging at the rear side of said top forming filter belt.

3. The device of claim 1, wherein a seal is provided in said dewatering zones at the side edges between the top and bottom filter belts forming said wedge-shaped compartment, the seal being resiliently deformable in accordance with the wedge shape.

4. The device of claim 1, wherein the drum first contacted by said pair of filter belts containing output sludge from said second stage is larger than the remaining drum or drums of said third dewatering stage.

5. The device of claim 4, wherein more than two drums are provided in said third dewatering stage and the drums following said first sludge contacted drum have the same diameter.

6. The device of claim 5, wherein the first and second drums contacted by said pair of filter belts containing output sludge from said second dewatering stage are constructed as screen drums, and the drums thereafter alternate between drums having no surface perforations and drums having surface perforations.

7. The device of claim 6, wherein a wiper is disposed at each drum for removing water from said belt assembly.

8. The device of claim 7, wherein said wipers are constructed as pressure rollers.

9. The device of claim 1, wherein said pair of filter belts are guided upwards between the platen belts and the first platen belt at the inlet side is guided over a large-diameter deflecting wheel.

10. The device of claim 9, wherein the diameter of the deflecting wheel is approximately equal to the diameter of the last drum contacted by the said pair of filter belts in said third dewatering stage.

11. The device according to claim 1, wherein said high-pressure stage is a platen press having three endless rotating platen belts defining two nips between which said output sludge from said third stage sequentially passes.

12. The device of claim 1, wherein each said respective flat surface is constructed as a screen member which has a plurality of spaced skimming edges extending transversely to the direction of movement of an associated horizontal filter belt, for stripping the liquid leaving the rear side of said associated horizontal filter belt.

13. The device of claim 12 wherein said plurality of spaced skimming edges extend to right angles to the direction of movement of an associated filter belt therealong.

14. The device of claim 13 wherein said screen further comprises a plurality of spaced longitudinally extending walls disposed perpendicularly to said plurality of spaced skimming edges, said skimming edges and walls defining areas between them for conveying away liquid from an associated filter belt.

15. The device of claim 14 wherein said areas are formed as equal size rectangles disposed along the length and width of said screen.

16. The device of claim 14 wherein said areas are formed as rectangles of at least two sizes disposed along the length and width of said screen.

17. The device of claim 12 wherein each of said plurality of spaced skimming edges is formed in a V-shape pointing in a longitudinal direction with respect to the movement of an associated filter belt therealong.

18. The device of claim 17 wherein said screen further comprises a plurality of longitudinal walls extending in the direction of said movement of an associated filter belt, said skimming edges and walls defining areas between them for conveying away liquid from said associated filter belt.

19. The device of claim 12 wherein some of said skimming edges are formed in a V-shape pointed in a longitudinal direction with respect to movement of an associated filter belt therealong and the remainder of said skimming edges are formed as spaced lines which are disposed perpendicularly to said direction of movement.

20. The device of claim 12, wherein each said screen member is made of plastic.

21. The device of claim 2 wherein each said pressure roller assembly is pressurized towards a respective top-forming filter belt.

22. The device of claim 1, wherein a screen member is disposed on the rear side of each filter belt which forms the top of a said wedge-shaped compartment along substantially the entire length of said compartment, said screen member bearing on the rear surface of said top forming filter belt and having skimming edges which extend at an angle to the direction of sludge movement for removing the fluid leaving the rear side of the top forming filter belt.

23. The device of claim 22, wherein each said screen member is pressurized toward a respective top forming filter belt.

24. The device of claim 22, wherein each said screen member is springloaded to form a pressure grid and is adjustable.

25. The device of claim 1, wherein the platen belts are formed of plates which have diagonal or V-shaped grooves on the side facing said filter belts for conducting away squeezed-out liquid.

26. The device of claim 25, wherein said plates of the platen belts comprise a steel core with a plastic covering.

27. The device of claim 25 wherein the grooves of successive plates of said platen belts form substantially continuous liquid flow paths.

* * * * *